United States Patent
Kang et al.

(10) Patent No.: US 12,444,538 B2
(45) Date of Patent: Oct. 14, 2025

(54) MULTILAYER ELECTRONIC COMPONENT HAVING EXTERNAL ELECTRODE WHICH INCLUDES RESIN LAYER AND CONDUCTIVE RESIN LAYER

(71) Applicant: SAMSUNG ELECTRO-MECHANICS CO., LTD., Suwon-si (KR)

(72) Inventors: Byung Woo Kang, Suwon-si (KR); Jung Min Kim, Suwon-si (KR); Hong Je Choi, Suwon-si (KR); Ji Hye Han, Suwon-si (KR); Hye Jin Park, Suwon-si (KR); Su Yun Yun, Suwon-si (KR); Sang Wook Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 314 days.

(21) Appl. No.: 18/119,391

(22) Filed: Mar. 9, 2023

(65) Prior Publication Data

US 2024/0170219 A1 May 23, 2024

(30) Foreign Application Priority Data

Nov. 21, 2022 (KR) .......................... 10-2022-0156407

(51) Int. Cl.
*H01G 4/232* (2006.01)
*H01G 4/30* (2006.01)
(Continued)

(52) U.S. Cl.
CPC .............. *H01G 4/232* (2013.01); *H01G 4/30* (2013.01); *H01G 2/065* (2013.01); *H01G 4/12* (2013.01)

(58) Field of Classification Search
None
See application file for complete search history.

(56) References Cited

U.S. PATENT DOCUMENTS

| | | | |
|---|---|---|---|
| 2008/0073108 A1* | 3/2008 | Saito | H01G 4/2325 174/256 |
| 2019/0098761 A1* | 3/2019 | Yoshida | H01C 7/008 |

(Continued)

FOREIGN PATENT DOCUMENTS

| | | |
|---|---|---|
| JP | 2016-009836 A | 1/2016 |
| KR | 10-2211744 B1 | 2/2021 |
| KR | 10-2021-0077972 A | 6/2021 |

*Primary Examiner* — Eric W Thomas
(74) *Attorney, Agent, or Firm* — Morgan, Lewis & Bockius LLP

(57) ABSTRACT

A multilayer electronic component includes: a body having a dielectric layer and first and second internal electrodes alternately disposed with each other while having the dielectric layer interposed therebetween in a first direction; and an external electrode including a connection portion and a band portion extending from the connection portion onto first and second surfaces of the body, wherein the external electrode further includes an electrode layer connected to one of the first and second internal electrodes, a resin layer in contact with the first and second surfaces, and a conductive resin layer disposed on the electrode layer and extending to the resin layer, and L1'≥L1 when L1 indicates a second-directional size of the resin layer in the band portion, and L1' indicates a second-directional size of the conductive resin layer in the band portion.

20 Claims, 8 Drawing Sheets

(51) Int. Cl.
 *H01G 2/06* (2006.01)
 *H01G 4/12* (2006.01)

(56) References Cited

U.S. PATENT DOCUMENTS

| | | | |
|---|---|---|---|
| 2019/0180941 A1* | 6/2019 | Choi | H01G 4/30 |
| 2019/0392991 A1* | 12/2019 | Harada | H01G 4/228 |
| 2020/0273621 A1 | 8/2020 | Yi et al. | |
| 2021/0193391 A1 | 6/2021 | Yi et al. | |
| 2022/0139616 A1* | 5/2022 | Kang | H01G 4/224 |
| | | | 361/301.4 |
| 2022/0139626 A1* | 5/2022 | Cho | H05K 1/111 |
| | | | 174/260 |

* cited by examiner

MULTILAYER ELECTRONIC COMPONENT HAVING EXTERNAL ELECTRODE WHICH INCLUDES RESIN LAYER AND CONDUCTIVE RESIN LAYER

CROSS-REFERENCE TO RELATED APPLICATION(S)

This application claims the benefit of priority to Korean Patent Application No. 10-2022-0156407 filed on Nov. 21, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on a printed circuit boards of various types of electronic products, such as an image display device including a liquid crystal display (LCD) or a plasma display panel (PDP), a computer, a smartphone or a mobile phone, to serve to charge or discharge electricity therein or therefrom.

The MLCC may be used as a component of various electronic apparatuses because the MLCC is small, has high capacity, and may be easily mounted. There has been increasing demand for the MLCC to have a smaller size and higher capacitance as each of various electronic devices such as a computer and a mobile device has a smaller size and higher output.

In order for improved bending strength of the MLCC, conventionally proposed is a method of forming each external electrode of the MLCC into a two-layer structure of an electrode layer connected to an internal electrode and a conductive resin layer disposed on the electrode layer. In this case, a factor that greatly affects the bending strength of the MLCC may be a length of a band portion of the external electrode to be described below because more stress acting on the external electrode may be dispersed as the band portion has a longer length.

Meanwhile, a peeling-off phenomenon may occur, in which an end of the band portion is separated when a lower adhesive strength acts between the external electrodes and a body portion of the MLCC in which dielectric layers and the internal electrodes are laminated. Accordingly, the band portion may have a reduced length by an amount of an end thereof separated by the peel-off phenomenon, and as a result, the MLCC may have a lower bending strength. The lower bending strength of the MLCC may adversely affect reliability of the MLCC such as cracks occurring in the body portion.

In addition, the conductive resin layer applied to the external electrode may include a large amount of metal particles dispersed in resin to secure an electrical characteristic of the MLCC, which may inevitably reduce the adhesive strength between the external electrode and the body portion. Therefore, required are studies on a structure of the external electrode to secure the adhesive strength between the external electrode and the body portion.

SUMMARY

An aspect of the present disclosure may provide a multilayer electronic component with an improved bending strength by improving adhesive strength between an external electrode and a body portion thereof.

However, the present disclosure is not limited to the description above, and may be more readily understood in the description of exemplary embodiments of the present disclosure.

According to an aspect of the present disclosure, a multilayer electronic component may include: a body including a dielectric layer and first and second internal electrodes alternately disposed with each other while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion onto the first and second surfaces; and a second external electrode including a second connection portion disposed on the fourth surface and a second band portion extending from the second connection portion onto the first and second surfaces, wherein the first external electrode includes a first electrode layer connected to the first internal electrode, a first resin layer in contact with the first and second surfaces, and a first conductive resin layer disposed on the first electrode layer and extending to the first resin layer, the second external electrode includes a second electrode layer connected to the second internal electrode, a second resin layer in contact with the first and second surfaces, and a second conductive resin layer disposed on the second electrode layer and extending to the second resin layer, and $L1' \geq L1$ when $L1$ indicates a second-directional size of the first resin layer in the first band portion, and $L1'$ indicates a second-directional size of the first conductive resin layer in the first band portion.

According to another aspect of the present disclosure, a multilayer electronic component may include: a body including a dielectric layer and first and second internal electrodes alternately disposed with each other while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first electrode layer disposed on the third surface, a first resin layer in contact with the first and second surfaces, and a first conductive resin layer disposed on the first electrode layer and extending to the first resin layer; and a second external electrode including a second electrode layer disposed on the fourth surface, a second resin layer in contact with the first and second surfaces, and a second conductive resin layer disposed on the second electrode layer and extending to the second resin layer, wherein the first and second resin layers include no metal, the first and second conductive resin layers include metal and resin, the first conductive resin layer covers the first resin layer, and the second conductive resin layer covers the second resin layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
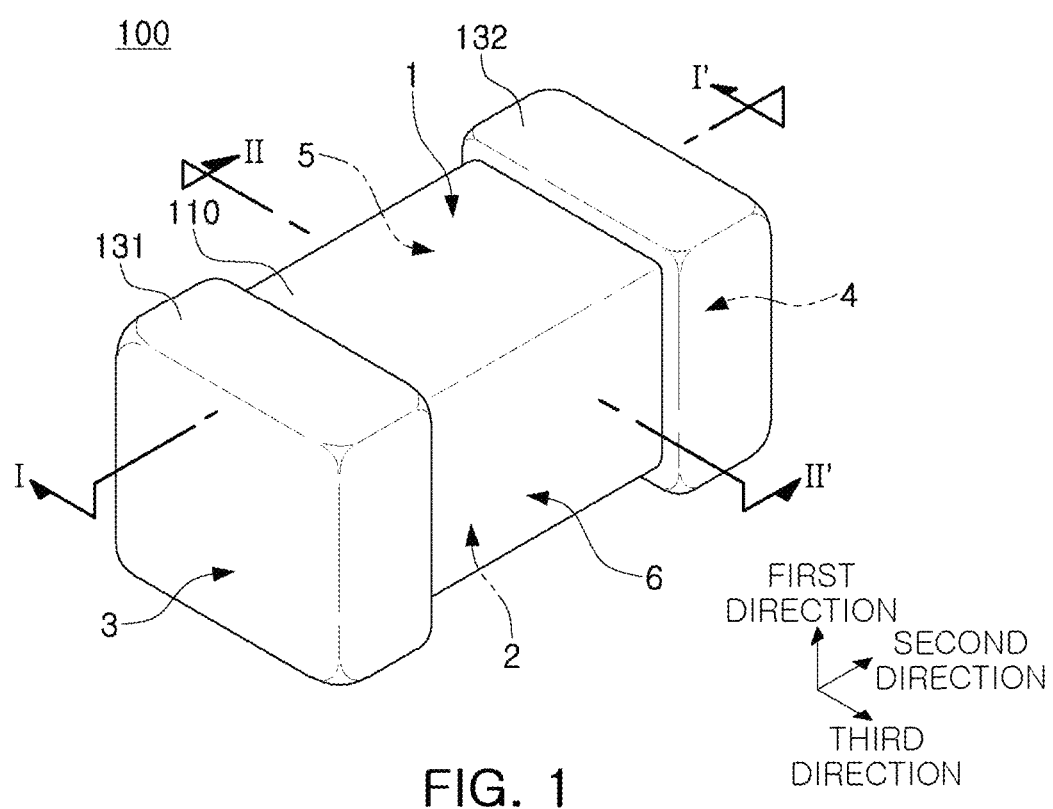
FIG. 1 is a perspective view schematically showing a multilayer electronic component according to an exemplary embodiment of the present disclosure.

Hereinafter, exemplary embodiments of the present disclosure will now be described in detail with reference to the accompanying drawings.

In the drawings, a first direction may indicate a thickness (T) direction, a second direction may indicate a length (L) direction, and a third direction may indicate a width (W) direction.

FIG. 1 is a perspective view schematically showing a multilayer electronic component according to an exemplary embodiment of the present disclosure.

Figure 2:
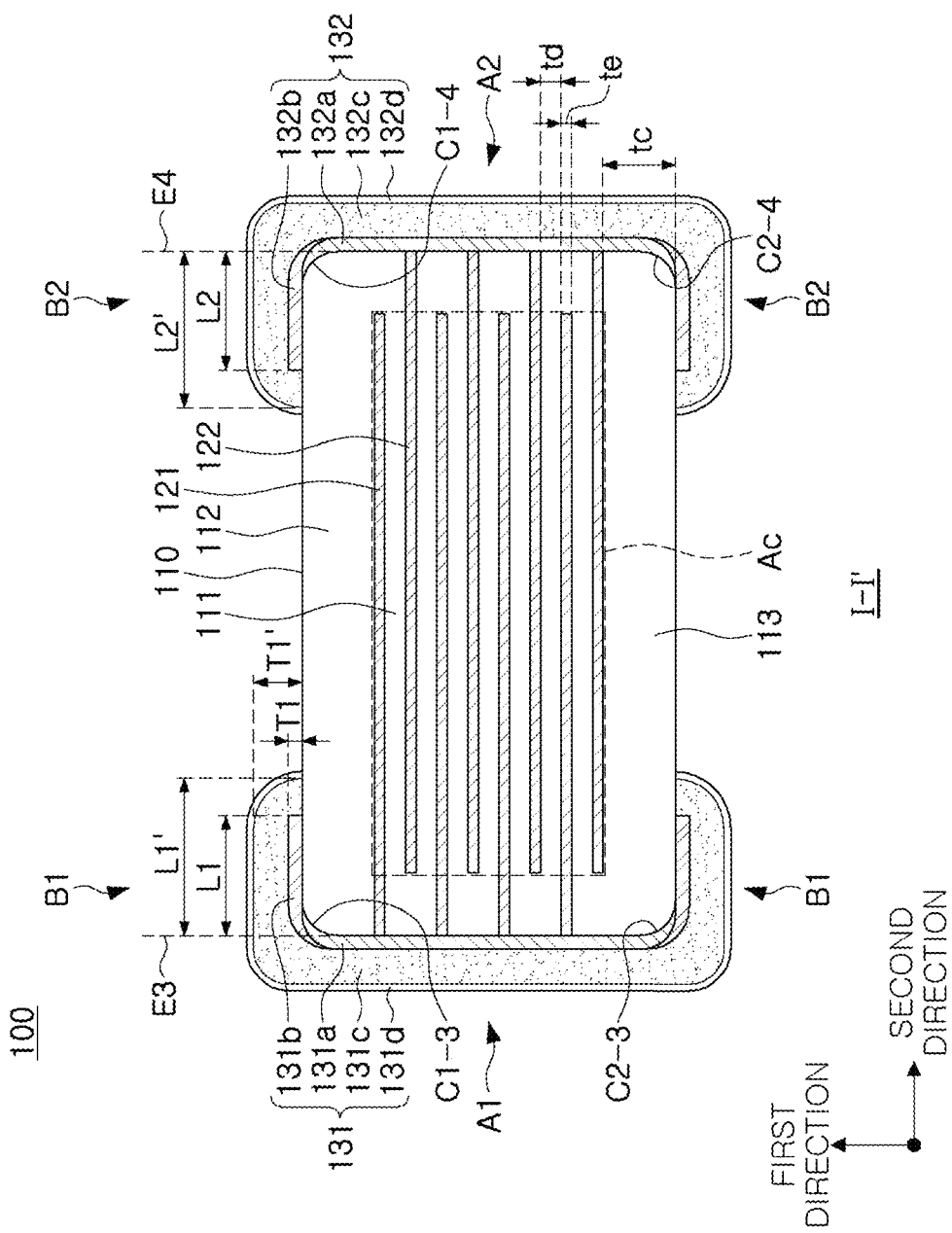
FIG. 2 is a cross-sectional view schematically showing a section I-I' in FIG. 1.

FIG. 2 is a cross-sectional view schematically showing a section I-I' in FIG. 1.

Figure 3:
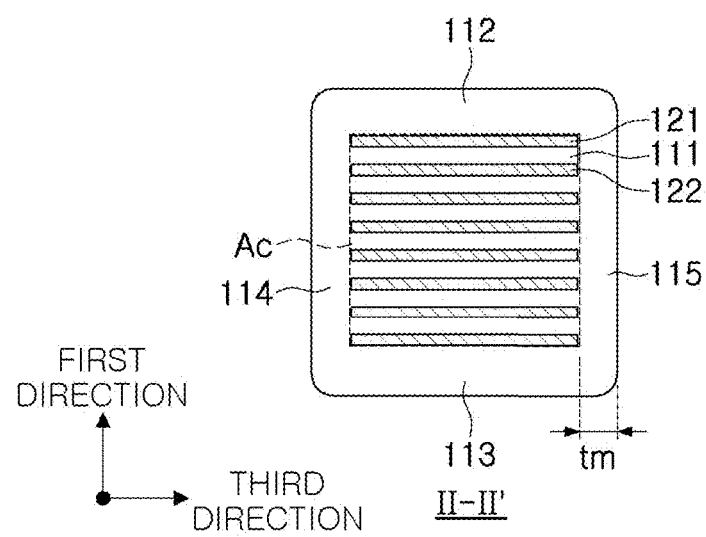
FIG. 3 is a cross-sectional view schematically showing a section II-II' in FIG. 1.

FIG. 3 is a cross-sectional view schematically showing a section II-II' in FIG. 1.

Figure 4:
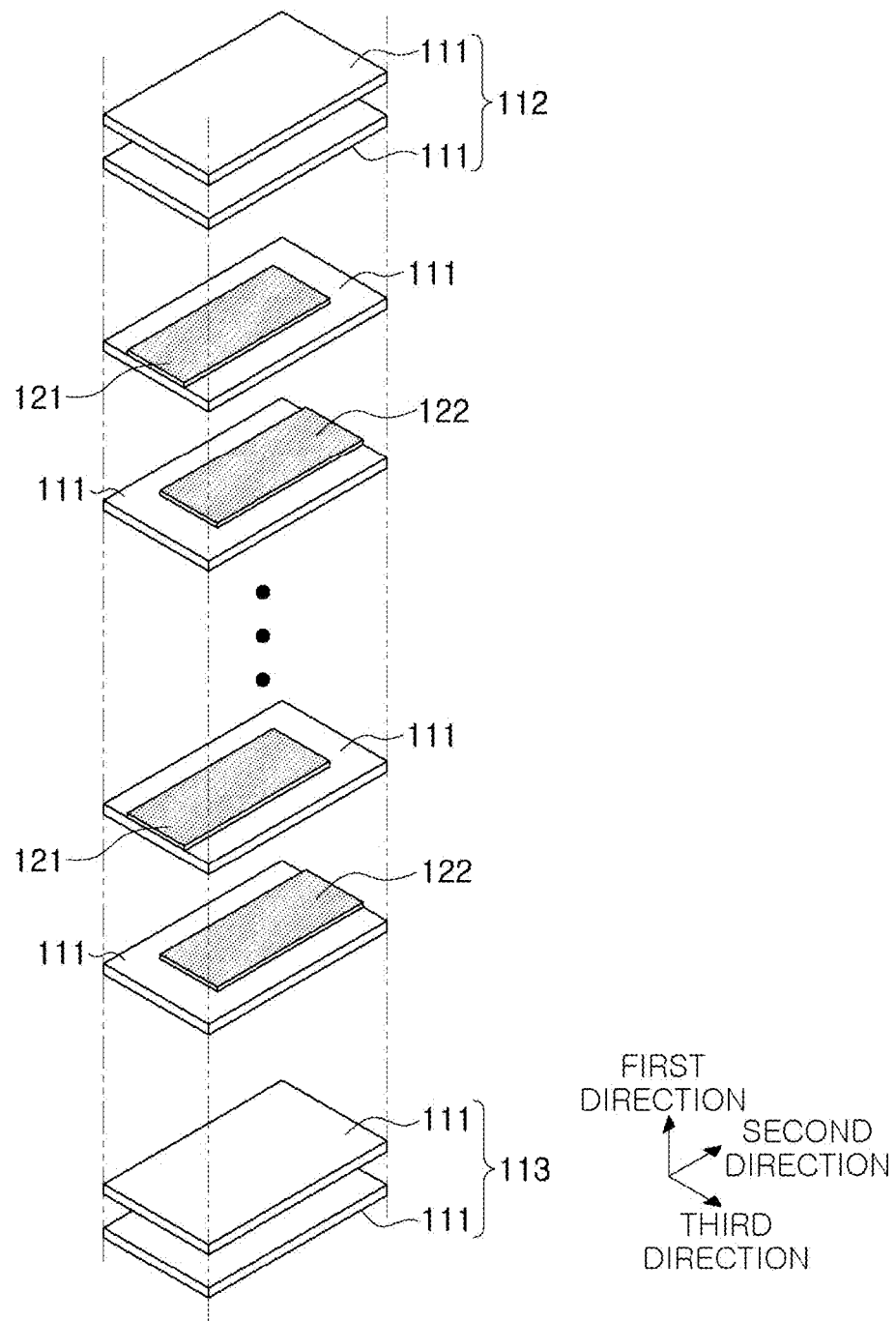
FIG. 4 is an exploded perspective view schematically showing an exploded body portion of the multilayer electronic component according to an exemplary embodiment of the present disclosure.

FIG. 4 is an exploded perspective view schematically showing an exploded body portion of the multilayer electronic component according to an exemplary embodiment of the present disclosure.

Referring to FIGS. 1 to 4, a multilayer electronic component 100 according to an exemplary embodiment of the present disclosure may include: a body 110 including a dielectric layer 111 and first and second internal electrodes 121 and 122 alternately disposed with each other while having the dielectric layer interposed therebetween, and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; a first external electrode 131 including a first connection portion A1 disposed on the third surface 3 and a first band portion B1 extending from the first connection portion onto the first and second surfaces; and a second external electrode 132 including a second connection portion A2 disposed on the fourth surface and a second band portion B2 extending from the second connection portion onto the first and second surfaces, wherein the first external electrode includes a first electrode layer 131a connected to the first internal electrode, a first resin layer 131b in contact with the first and second surfaces, and a first conductive resin layer 131c disposed on the first electrode layer and extending to the first resin layer, the second external electrode includes a second electrode layer 132a connected to the second internal electrode, a second resin layer 132b in contact with the first and second surfaces, and a second conductive resin layer 132c disposed on the second electrode layer and extending to the second resin layer, and L1'≥L1 when L1 indicates a second-directional size of the first resin layer in the first band portion, and L1' indicates a second-directional size of the first conductive resin layer in the first band portion.

As described above, the conductive resin layer 131c or 132c may include a large amount of metal particles dispersed in resin to secure an electrical characteristic of the multilayer electronic component, thus lowering adhesive strength between the external electrode 131 or 132 and the body 110. On the other hand, the multilayer electronic component 100 according to an exemplary embodiment of the present disclosure may include the resin layer 131b or 132b in contact with the first and second surfaces 1 and 2 of the body to thus improve the adhesive strength between the external electrode 131 or 132 and the body 110.

In addition, L1'≥L1 when L1 indicates a second-directional size of the first resin layer 131b in the first band portion B1, and L1' indicates a second-directional size of the first conductive resin layer 131c in the first band portion, thereby preventing an end of the resin layer 131b that is externally exposed from being peeled off, and preventing the resin layer 131b from having a lower heat resistance and/or adhesive strength due to the end of the resin layer 131b that is exposed to a high-temperature environment. As a result, the multilayer electronic component 100 may have a further improved bending strength.

Hereinafter, the description more specifically describes each component included in the multilayer electronic component 100 according to an exemplary embodiment of the present disclosure.

The body 110 is not limited to a particular shape, and may have a hexahedral shape or a shape similar to the hexahedral shape, as shown in the drawings. The body 110 may not have the hexahedron shape having perfectly straight lines because a ceramic powder included in the body 110 is contracted or its edge is polished in a process of sintering the body. However, the body 110 may have the substantially hexahedral shape.

The body 110 may have the first and second surfaces 1 and 2 opposing each other in the first direction, the third and fourth surfaces 3 and 4 connected to the first and second surfaces and opposing each other in the second direction, and the fifth and sixth surfaces 5 and 6 connected to the first to fourth surfaces and opposing each other in the third direction.

The body 110 may include a 1-3-th corner C1-3 connecting the first surface 1 and the third surface 3 to each other, a 1-4-th corner C1-4 connecting the first surface 1 and the fourth surface 4 to each other, a 2-3-th corner C2-3 connecting the second surface 2 and the third surface 3 to each other, and a 2-4-th corner C2-4 connecting the second surface 2 and the fourth surface 4 to each other. In addition, the body portion 110 may have a 1-5-th corner connecting the first surface 1 and the fifth surface 5 to each other, a 1-6-th corner connecting the first surface 1 and the sixth surface 6 to each other, a 2-5-th corner connecting the second surface 2 and the fifth surface 5 to each other, and a 2-6-th corner connecting the second surface 2 and the sixth surface 6 to each other. The corner may have a round shape by rounding the corner connecting the respective surfaces of the body 110 to each other by performing a separate process. The first to sixth surfaces 1 to 6 of the body 110 may generally be flat surfaces, and non-flat regions may be the corners.

The body 110 may include the dielectric layer 111 and the internal electrodes 121 and 122, which are alternately laminated on each other. The plurality of dielectric layers 111 forming the body 110 may be in a sintered state, and adjacent dielectric layers 111 may be integrated with each other so that boundaries therebetween may not be readily apparent without a scanning electron microscope (SEM).

The dielectric layer 111 may be formed by preparing a ceramic slurry including a ceramic powder, an organic solvent and a binder, coating the slurry on a carrier film to prepare a ceramic green sheet and drying the same, and then sintering the ceramic green sheet. The ceramic powder is not particularly limited as long as the power may obtain sufficient capacitance, and may use, for example, barium titanate ($BaTiO_3$)-based powder.

An average thickness td of the dielectric layer 111 may not need to be particularly limited, and may be 10 μm or less to achieve the smaller size and higher capacitance of the multilayer electronic component 100. In addition, the average thickness td of the dielectric layer 111 may be arbitrarily set based on a desired characteristic or usage. For example, an electronic component for a high voltage electric field may include the dielectric layer 111 whose average thickness td is 2.8 μm or less, and a small IT electronic component may include the dielectric layer 111 whose average thickness td is 0.4 μm or less to achieve the smaller size and higher capacitance of the multilayer electronic component. However, the present disclosure is not limited thereto.

Meanwhile, in order to achieve the smaller size and higher capacitance of the multilayer electronic component 100, the dielectric layer 111 may be required to have a smaller thickness to thus increase the number of laminated layers. However, cracks may easily occur in the body 110 due to bending stress occurring when a voltage is applied thereto conventionally as the dielectric layer 111 has the smaller thickness. On the other hand, in the multilayer electronic component 100 according to an exemplary embodiment of the present disclosure, the external electrode 131 or 132 may include the resin layer 131*b* or 132*b* to improve the bending strength of the multilayer electronic component. Accordingly, the multilayer electronic component may have improved reliability even when the average thickness td of the dielectric layer 111 is 10 μm or less, 2.8 μm or less, or 0.4 μm or less.

Here, the average thickness td of the dielectric layer 111 may indicate a first-directional size of the dielectric layer 111 disposed between the internal electrodes 121 and 122. The average thickness of the dielectric layer 111 may be measured by scanning a cross-section of the body 110 cut in a first-second direction by using the scanning electron microscope with a magnification of 10,000. In more detail, an average thickness value of the dielectric layer 111 may be obtained by averaging the thicknesses of one dielectric layer measured at a plurality of points, for example, at thirty equally spaced points in the second direction. The thirty equally spaced points may be designated in a capacitance formation portion Ac described below. In addition, it is possible to obtain a more general average thickness of the dielectric layer 111 when measuring its average value by extending a measurement target of the average value to ten dielectric layers 111.

The internal electrode 121 or 122 may be alternately disposed with the dielectric layer 111, and for example, the first internal electrode 121 and the second internal electrode 122, which are a pair of electrodes having different polarities, may be disposed to oppose each other while having the dielectric layer 111 interposed therebetween. The plurality of first internal electrodes 121 and the plurality of second internal electrodes 122 may be electrically insulated from each other by the dielectric layer 111 interposed therebetween.

Each of the plurality of first internal electrodes 121 may be spaced apart from the fourth surface 4 and connected to the third surface 3. In addition, each of the plurality of second internal electrodes 122 may be spaced apart from the third surface 3 and connected to the fourth surface 4.

A conductive metal included in the internal electrode 121 or 122 may be one or more of nickel (Ni), copper (Cu), palladium (Pd), silver (Ag), gold (Au), platinum (Pt), tin (Sn), tungsten (W), titanium (Ti) or an alloy thereof, and is not limited thereto.

The internal electrode 121 or 122 may be formed by coating a conductive paste for an internal electrode that includes the conductive metal to a predetermined thickness on the ceramic green sheet and firing the same. A method of printing the conductive paste for an internal electrode may be a screen printing method, a gravure printing method, or the like, and the present disclosure is not limited thereto.

An average thickness te of the internal electrode 121 or 122 is not particularly limited, and may be, for example, 3 μm or less. In addition, the average thickness te of the internal electrode 121 or 122 may be arbitrarily set based on a desired characteristic or usage. For example, the electronic component for a high voltage electric field may include the internal electrode 121 or 122 whose average thickness te is 1 μm or less, and the small IT electronic component may include the internal electrode 121 or 122 whose average thickness te is 0.4 μm or less to achieve the smaller size and higher capacitance of the multilayer electronic component. However, the present disclosure is not limited thereto.

Meanwhile, as described above, in the multilayer electronic component 100 according to an exemplary embodiment of the present disclosure, the external electrode 131 or 132 may include the resin layer 131*b* or 132*b* to improve the bending strength of the multilayer electronic component. Accordingly, the multilayer electronic component may have the improved reliability even when the average thickness te of the internal electrode 121 or 122 is 3 μm or less, 1 μm or less, or 0.4 μm or less.

Here, the average thickness te of the internal electrode 121 or 122 may indicate a first-directional size of the internal electrode 121 or 122. Here, the average thickness of the internal electrode 121 or 122 may be measured by scanning the cross-section of the body 110 cut in the first-second direction by using the scanning electron microscope (SEM) with the magnification of 10,000. In more detail, an average thickness value of the internal electrode 121 or 122 may be obtained by averaging the thicknesses of one internal electrode measured at a plurality of points, for example, at thirty equally spaced points in the second direction. The thirty equally spaced points may be designated in the capacitance formation portion Ac described below. In addition, it is possible to obtain a more general average thickness of the internal electrode 121 or 122 when measuring its average value by extending a measurement target of the average value to ten internal electrode 121 or 122. Other measurement methods and/or tools appreciated by one of ordinary skill in the art, even if not described in the present disclosure, may also be used.

The body 110 may include a capacitance formation portion Ac disposed in the body 110, and including the first and second internal electrodes 121 and 122 opposing each other while having the dielectric layer 111 interposed therebetween to form capacitance of the multilayer electronic component, and a first cover portion 112 and a second cover portion 113 disposed on both end surfaces of the capacitance formation portion Ac, opposing each other, in the first direction. The cover portion 112 or 113 may basically serve to prevent the internal electrode from being damaged due to the physical or chemical stress. The cover portion 112 or 113 may have the same configuration as the dielectric layer 111 except for not including any internal electrode, the present disclosure is not limited thereto, and the cover portion 112 or 113 may have a configuration different from that of the dielectric layer 111.

An average thickness tc of the cover portion 112 or 113 is not particularly limited, and may be, for example, 100 µm or less. In addition, the average thickness tc of the cover portion 112 or 113 may be arbitrarily set based on a desired characteristic or usage. For example, the electronic component for a high voltage electric field may include the cover portion 112 or 113 whose average thickness tc is 40 µm or less, and the small IT electronic component may include the cover portion 112 or 113 whose average thickness tc is 20 µm or less to achieve the smaller size and higher capacitance of the multilayer electronic component. However, the present disclosure is not limited thereto.

As described above, in the multilayer electronic component 100 according to an exemplary embodiment of the present disclosure, the external electrode 131 or 132 may include the resin layer 131b or 132b to improve the bending strength of the multilayer electronic component.

Accordingly, the multilayer electronic component may have the improved reliability even when the average thickness tc of the cover portion 112 or 113 is 100 µm or less, 40 µm or less, or 20 µm or less.

The average thickness tc of the cover portion 112 or 113 may indicate an average size of the cover portion 112 or 113 in the first direction, and indicate an average thickness of each of the first cover portion 112 and the second cover portion 113. In addition, the average thickness of the cover portion 112 or 113 may be obtained by averaging its first-directional sizes measured at five equally spaced points in the cross-section of the body 110 cut in the first-second direction.

The body 110 may include margin portions 114 and 115 disposed on both side surfaces of the capacitance formation portion Ac, opposing each other in the third direction. That is, the margin portion 114 or 115 may indicate a region between an end of the internal electrode 121 or 122 and a boundary surface of the body 110 based on a cross-section of the body 110 cut in a first-third direction. Here, the margin portions may include the first margin portion 114 connected to the fifth surface 5 of the body 110 and the margin portion 115 connected to the sixth surface 6 of the body 110.

The margin portion 114 or 115 may include the same material as the dielectric layer 111 except for not including the internal electrode 121 or 122. The margin portion 114 or 115 may basically serve to prevent the internal electrode 121 or 122 from being damaged due to the physical or chemical stress.

The margin portion 114 or 115 may be formed by coating the conductive paste for an internal electrode on the ceramic green sheet except for its portion the margin portion is to be formed and sintering the same. Alternatively, in order to suppress a step difference occurring due to the internal electrode 121 or 122, the margin portion 114 or 115 may be formed by laminating the internal electrodes on each other, then cutting the internal electrodes to be connected to the fifth and sixth surfaces 5 and 6 of the body, and then laminating one dielectric layer or two or more dielectric layers on both side surfaces of the capacitance formation portion Ac, opposing each other in the third direction.

An average thickness tm of the margin portion 114 or 115 may not need to be particularly limited. However, the average thickness of the margin portion 114 or 115 may be 40 µm or less, 30 µm or less, or 20 µm or less to achieve the smaller size and higher capacitance of the multilayer electronic component. As described above, in the multilayer electronic component 100 according to an exemplary embodiment of the present disclosure, the external electrode 131 or 132 may include the resin layer 131b or 132b to improve the bending strength of the multilayer electronic component. Accordingly, the multilayer electronic component may have the improved reliability even when the average thickness tm of the margin portion 114 or 115 is 40 µm or less, 30 µm or less, or 20 µm or less.

Here, the average thickness tm of the margin portion 114 or 115 may indicate an average thickness of each of the first margin portion 114 and the second margin portion 115. The average thickness tm of the margin portion 114 or 115 may indicate an average third-directional size of the margin portion 114 or 115, and may be obtained by averaging its third-directional sizes measured at five equally spaced points in the cross-section of the body 110 cut in the first-third direction.

The external electrodes 131 and 132 may respectively be disposed on the third and fourth surfaces 3 and 4 of the body 110, and partially extend to the first, second, fifth and sixth surfaces 5 and 6 of the body 110. In addition, the external electrodes 131 and 132 may include the first external electrode 131 connected to the plurality of first internal electrodes 121 and the second external electrode 132 connected to the plurality of second internal electrodes 122.

In addition, the first external electrode 131 may include a first connection portion A1 disposed on the third surface, and a first band portion B1 extending from the first connection portion onto the first and second surfaces; and the second external electrode 132 may include a second connection portion A2 disposed on the fourth surface, and a second band portion B2 extending from the second connection portion onto the first and second surfaces. The first band portion B1 may also extend from the first connection portion to the fifth and sixth surfaces, and the second band portion B2 may also extend from the second connection portion to the fifth and sixth surfaces.

The first external electrode 131 may include the first electrode layer 131a connected to the first internal electrode, the first resin layer 131b in contact with the first and second surfaces, and the first conductive resin layer 131c disposed on the first electrode layer and extending to the first resin layer; and the second external electrode 132 may include the second electrode layer 132a connected to the second internal electrode, the second resin layer 132b in contact with the first and second surfaces, and the second conductive resin layer 132c disposed on the second electrode layer and extending to the second resin layer. In addition, the first external electrode 131 may include a first plating layer 131d disposed on the first conductive resin layer 131c, and the second external electrode 132 may include a second plating layer 132d disposed on the second conductive resin layer 132c.

The first electrode layer 131a may serve to connect the first internal electrode 121 and the first external electrode 131 with each other, and the second electrode layer 132a may serve to connect the second internal electrode 122 and the second external electrode 132 with each other.

The conductive metal included in the first or second electrode layer 131a or 132a may not need to be particularly limited, may include, for example, one or more of nickel (Ni), copper (Cu), chromium (Cr), tin (Sn), palladium (Pd), or an alloy thereof, and may include copper (Cu) and/or nickel (Ni). In addition, the electrode layer 131a or 132a may include glass to secure the bonding strength between the external electrode 131 or 132 and the body 110, and the present disclosure is not limited thereto.

In this case, the electrode layer 131a or 132a may be formed by dipping the third or fourth surface of the body 110 into the conductive paste including the conductive metal and glass, or by transferring a sheet including the conductive metal and glass to the third or fourth surface of the body 110 and then firing the same.

The first resin layer 131b or the second resin layer 132b may be in contact with the first or second surface 1 or 2 of the body 110. In addition, the first resin layer 131b or the second resin layer 132b may be in contact with the fifth or sixth surface 6 of the body 110. The resin layer 131b or 132b may serve to secure the adhesive strength between the external electrode 131 or 132 and the body 110. It is thus possible to prevent a peeling-off phenomenon in which an end of the band portion B1 or B2 is separated, thereby resultantly improving the bending strength of the multilayer electronic component 100.

A method of forming the first and second resin layers 131b and 132b may not need to be particularly limited. For example, the first and second resin layers 131b and 132b may be formed by dipping the body portion on which first and second electrode layers 131a and 132a are formed into a resin composition, removing the resin composition coated on the connection portions A1 and A2, and then curing the same through heat treatment.

Here, L1'≥L1 when L1 indicates the second-directional size of the first resin layer 131b in the first band portion B1, and L1' indicates the second-directional size of the first conductive resin layer 131c in the first band portion B1. L1 or L1' may be measured by observing a cross-section of the multilayer electronic component cut in the first-second direction from its center in the third direction by using the scanning electron microscope (SEM) with a magnification of 1,000 times or more. Here, L1 may indicate a distance in the second direction from an extension line E3 of the third surface 3 to the end of the first resin layer 131b disposed on the first or second surface 1 or 2, and L1' may indicate a distance in the second direction from the extension line E3 of the third surface 3 to an end of the first conductive resin layer 131c disposed on the first or second surface 1 or 2. Here, the extension line E3 of the third surface 3 may indicate a line extending based on a flat portion of the third surface 3. In addition, when the first resin layer 131b does not cross the extension line E3 of the third surface 3 in the first direction, L1 may indicate a distance in the second direction from one end of the first resin layer 131b that is adjacent to the extension line E3 of the third surface 3 to the other end of the first resin layer 131b opposing one end thereof that is adjacent to the extension line E3 of the third surface 3.

When the second-directional size L1 of the first resin layer 131b is greater than the second-directional size L1' of the first conductive resin layer 131c, the end of the first resin layer 131b may be externally exposed, which may cause the peeling-off phenomenon in which a portion of the first band portion B1 is separated from the end of the first resin layer 131b that is externally exposed. In addition, the end of the first resin layer 131b that is externally exposed may be exposed to a high-temperature environment, and the first resin layer 131b may thus have the lower heat resistance and/or adhesive strength. As a result, the multilayer electronic component may have poor appearance and/or poor mounting characteristic, and may have lower reliability because the bending stress applied to the multilayer electronic component fails to be effectively dispersed, resulting in cracks in the body 110.

On the other hand, L1'≥L1 in the multilayer electronic component 100 according to an exemplary embodiment of the present disclosure, thereby preventing the end of the first resin layer 131b from being externally exposed and preventing the peeling-off phenomenon from occurring in the end of the first resin layer 131b. It is also possible to prevent the first resin layer 131b from having the lower heat resistance and/or adhesive strength due to the end of the first resin layer 131b that is exposed to the high-temperature environment. It is thus possible to improve the bending strength of the multilayer electronic component 100, and effectively disperse the bending stress applied to the multilayer electronic component to improve the reliability of the multilayer electronic component.

Meanwhile, 0<(L1'−L1)/L1'≤0.1 when considering the adhesive strength between the external electrode 131 or 132 and the body 110, moisture resistance reliability, plating property at the end of the band portion B1 or B2, or the like. However, the present disclosure is not limited thereto.

Meanwhile, the first external electrode 131 and the second external electrode 132 may symmetrical to each other based on the second direction, and the description of the first resin layer 131b may thus be equally applied to the second resin layer 132b. That is, L2'≥L2 when L2 indicates a second-directional size of the second resin layer 132b in the second band portion B2, and L2' indicates a second-directional size of the second conductive resin layer 132c in the second band portion B2.

As described above, L2 may indicate a distance in the second direction from an extension line E4 of the fourth surface 4 to an end of the second resin layer 132b disposed on the first or second surface 1 or 2, and L2' may indicate a distance in the second direction from the extension line E4 of the fourth surface 4 to an end of the second conductive resin layer 132c disposed on the first or second surface 1 or 2. Here, the extension line E4 of the fourth surface 4 may indicate a line extending based on a flat portion of the fourth surface 4. In addition, when the second resin layer 132b does not cross the extension line E4 of the fourth surface 4 in the first direction, L2 may indicate a distance in the second direction from one end of the second resin layer 132b that is adjacent to the extension line E4 of the fourth surface 4 to the other end of the second resin layer 132b opposing one end thereof that is adjacent to the extension line E4 of the fourth surfac 4e.

The resin included in the resin layer 131b or 132b may not need to be particularly limited. The resin layer 131b or 132b may include, for example, one or more of epoxy resin, acrylic resin, polystyrene resin, vinyl acetate resin, polyester resin, polyethylene resin, polypropylene resin, polyamide resin, phenol resin, urethane resin, siloxane resin, melamine resin, or alkyd resin to improve the adhesive strength between the external electrode 131 or 132 and the body 110.

In an exemplary embodiment, the resin layers 131b and 132b may include no metal. The resin layer 131b or 132b including the metal may lower the adhesive strength between the external electrode 131 or 132 and the body 110 due to the metal included in the resin layer 131b or 132b and an outer surface of the body 110 in contact with each other.

Therefore, the resin layers 131*b* and 132*b* may be required not to include the metal. In addition, the resin layers 131*b* and 132*b* including no metal may have ductility and elastic modulus superior to the electrode layers 131*a* and 132*a* or the conductive resin layers 131*c* and 132*c*, thereby effectively reducing the bending stress applied to the multilayer electronic component.

In an exemplary embodiment, the first and second resin layers 131*b* and 132*b* may further include one or more of silica, alumina, glass, or zirconium dioxide ($ZrO_2$). The first and second resin layers 131*b* and 132*b* may further include one or more fillers selected from silica, alumina, glass, or zirconium dioxide, which may serve to improve the heat resistance of the first and second resin layers 131*b* and 132*b*, thus controlling the coating property and mechanical strength of the first and second resin layers 131*b* and 132*b*.

A content of the filler included in the first or second resin layer 131*b* or 132*b* may not need to be particularly limited. For example, an area ratio of the filler included in the first or second resin layer 131*b* or 132*b* may be 5% to 40% in consideration of the adhesive strength and mechanical strength of the first or second resin layer 131*b* or 132*b*. Here, the area ratio of the filler included in the first or second resin layer 131*b* or 132*b* may indicate the area ratio of the filler included in the first or second resin layer 131*b* or 132*b* to a total area of the resin and the filler, included in the first or second resin layer 131*b* or 132*b*. The area ratio of the filler included in the first or second resin layer 131*b* or 132*b* may be measured by scanning a cross-section of the multilayer electronic component cut in the first-second direction from its center in the third direction by using the scanning electron microscope (SEM), and then analyzing components included in the first or second resin layer 131*b* or 132*b* by using an energy dispersed spectrometry (EDS) or the like.

In an exemplary embodiment, T1'≥T1 when T1 indicates an average thickness of the first resin layer 131*b* in the first band portion B1, and T1' indicates an average thickness of the first conductive resin layer 131*c* in the first band portion B1. The average thickness T1 of the first resin layer 131*b* may be required to be smaller than the average thickness T1' of the first conductive resin layer 131*c* as long as the first resin layer 131*b* may provide the adhesive strength between the external electrode 131 and the body 110.

The average thickness T1 of the first resin layer 131*b* in the first band portion B1 may not need to be particularly limited, and may be, for example, 9 μm or less, in consideration of the capacitance of the multilayer electronic component per its unit volume as long as the first resin layer 131*b* may provide the adhesive strength between the external electrode 131 and the body 110.

T1 or T1' may indicate a first-directionAL size of the first resin layer 131*b* and that of the first conductive resin layer 131*c*, in the first band portion B1, and T1 and T1' may be measured by observing the cross-section of the multilayer electronic component cut in the first-second direction from its center in the third direction by using the a scanning electron microscope (SEM) with the magnification of 1,000 times or more. In more detail, T1 or T1' may be an average value obtained by averaging the thicknesses of the first resin layer 131*b* and the first conductive resin layer 131*c* respectively measured at five equally spaced points in the first band portion B1 in the second direction.

The first conductive resin layer 131*c* may be disposed on the first electrode layer 131*a* and extend to the first resin layer 131*b*, and the second conductive resin layer 132*c* may be disposed on the second electrode layer 132*a* and extend to the second resin layer 132*b*.

The conductive resin layers 131*c* and 132*c* may include the metal and the resin. The metal included in the conductive resin layers 131*c* and 132*c* may serve to electrically connect the electrode layers 131*a* and 132*a* and the plating layers 131*d* and 132*d*. The conductive metal included in the conductive resin layers 131*c* and 132*c* may not need to be particularly limited, and may include, for example, one or more of copper (Cu), nickel (Ni), silver (Ag), tin (Sn), chromium (Cr), or an alloy thereof.

The metal included in the conductive resin layers 131*c* and 132*c* may not need to be particularly limited, and may include, for example, one or more of a spherical particle or a flake particle. Here, the spherical particle may be not perfectly spherical, and for example, 1.45 or less may be a length ratio between the major and minor axes (or long and short axes) thereof. The flake particle may indicate a particle having a flat and elongated shape, is not particularly limited, and for example, 1.95 or more a length ratio between the major and minor axes (or long and short axes) thereof.

Lengths of the major and minor axes of the spherical particle and those of the flake particle may be measured from an image obtained by scanning the cross-section of the multilayer electronic component cut in the first-second direction from its center in the third direction by using the scanning electron microscope (SEM).

The resin included in the conductive resin layer 131*c* or 132*c* may basically serve to absorb impact applied to the multilayer electronic component. Accordingly, the resin may protect the multilayer electronic component from external physical impact or the bending stress, and prevent cracks from occurring in the multilayer electronic component by absorbing the stress or tensile stress applied thereto when the multilayer electronic component is mounted on a board.

The resin included in the conductive resin layer 131*c* or 132*c* may not need to be particularly limited, and may include, for example, epoxy resin and/or acrylic resin. In addition, the conductive resin layer 131*c* or 132*c* may include the same resin as the resin layer 131*b* or 132*b*, or may include a different resin from the resin layer 131*b* or 132*b*.

The conductive resin layer 131*c* or 132*c* may be formed by dipping the third and fourth surfaces of the body on which the electrode layers 131*a* and 132*a* and the resin layers 131*b* and 132*b* are formed into a conductive resin composition including the metal and the resin, and then curing the same through the heat treatment.

In an exemplary embodiment, the conductive resin layer 131*c* or 132*c* may further include an intermetallic compound. The intermetallic compound may indicate a compound having a specific crystal structure in which two or more types of metals are combined with each other in a simple integer ratio. The conductive resin layer 131*c* or 132*c* including the intermetallic compound may improve electrical connectivity due to the intermetallic compound in direct contact with a portion of the electrode layer 131*a* or 132*a* and/or the plating layer 131*d* or 132*d*.

The intermetallic compound included in the first or second conductive resin layer is not particularly limited, and may include one or more of $Ag_3Sn$, $Ni_3Sn_4$, $Cu_6Sn_5$ or $Cu_3Sn$. A method of forming the intermetallic compound may not need to be particularly limited, and, for example, the intermetallic compound may be formed by reacting with Ag, Ni, and/or Cu during its curing through the heat treatment when the first or second conductive resin layer includes a metal particle (for example, Sn) having a melting point lower than a curing temperature of the resin.

The plating layer 131*d* or 132*d* may improve a mounting characteristic of the multilayer electronic component. The plating layer 131*d* or 132*d* is not limited to a particular type, may include nickel (Ni), tin (Sn), palladium (Pd) and/or an alloy including the same, or may include a plurality of layers.

The plating layer 131*d* or 132*d* may be, for example, a nickel (Ni) plating layer or a tin (Sn) plating layer, and may be made by sequentially forming the Ni plating layer and the Sn plating layer. In addition, the plating layer 131*d* or 132*d* may include the plurality of nickel (Ni) plating layers and/or the plurality of tin (Sn) plating layers.

Hereinafter, the description describes embodiments according to various types of first and second external electrodes. However, the conductive resin layer and the plating layer may have the same configurations as described above, and the description thus omits overlapping descriptions thereof.

In an exemplary embodiment, ends of the first electrode layer 131*a* may be disposed on the 1-3-th corner C1-3 and the 2-3-th corner C2-3. In addition, ends of the second electrode layer 132*a* may be disposed on the 1-4-th corner C1-4 and the 2-4-th corner C2-4. The first electrode layer 131*a* and the first resin layer 131*b* may overlap each other on the 1-3-th corner C1-3 and the 2-3-th corner C2-3, and the second electrode layer 132*a* and the second resin layer 132*b* may overlap each other on the 1-4-th corner C1-4 and the 2-4-th corner C2-4. Here, at least one of the 1-3-th corner C1-3 or the 2-3-th corner C2-3 may be rounded, and at least one of the 1-4-th corner C1-4 or the 2-4-th corner C2-4 may be rounded. External moisture and/or plating solution penetrating into the body 110 may tend to penetrate into the corner of the body 110 that has a short distance to the internal electrode. At this time, the ends of the first and second electrode layers 131*a* and 132*a* may be disposed on the corners of the body, thus preventing the external moisture from penetrating into the corners of the body 110.

Here, the first resin layer 131*b* may be disposed to cover the end of the first electrode layer 131*a*, and the second resin layer 132*b* may be disposed to cover the end of the second electrode layer 132*a*, the present disclosure is not limited thereto, and the resin layers 131*b* and 132*b* may respectively be spaced apart from the electrode layers 131*a* and 132*a*.

Figure 5:
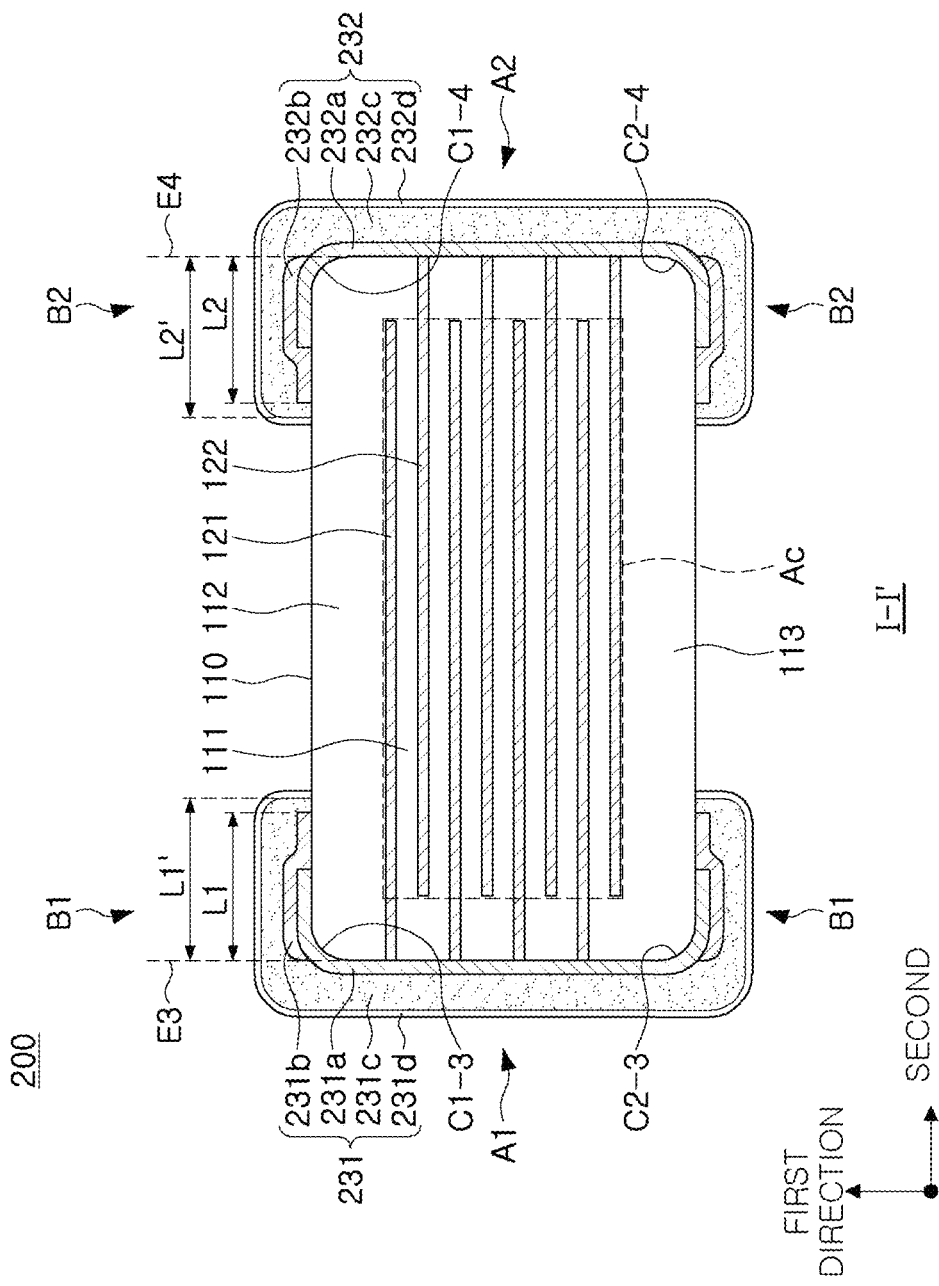
FIG. 5 shows a modified example of FIG. 2.

FIG. 5 shows a modified example of FIG. 2.

A multilayer electronic component 200 according to an exemplary embodiment of the present disclosure may include a first external electrode 231 including a first electrode layer 231*a*, a first resin layer 231*b*, a first conductive resin layer 231*c*, and a first plating layer 231*d*; and a second external electrode 232 including a second electrode layer 232*a*, a second resin layer 232*b*, a second conductive resin layer 232*c*, and a second plating layer 232*d*.

Ends of the first electrode layer 231*a* may be disposed on the first and second surfaces, and the first resin layer 231*b* in a first band portion may extend between the first electrode layer 231*a* and the first conductive resin layer 231*c*. Here, L1 may be larger than or equal to a second-directional size of the first electrode layer 231*a* in the first band portion, which is measured from the third surface to one end of the first electrode 231*a* in the second direction. In addition, an end of the second electrode layer 232*a* may be disposed on the first or second surface, and the second resin layer 232*b* in a second band portion may extend between the second electrode layer 232*a* and the second conductive resin layer 232*c*. The resin layer 231*b* or 232*b* may extend between the electrode layer 231*a* or 232*a* and the conductive resin layer 231*c* or 232*c* to suppress bending stress from propagating to the body and prevent the end of the first electrode layer 231*a* or 232*a* disposed on the first or second surface from being peeled-off.

Meanwhile, the end of the resin layer 231*b* or 232*b* that is disposed between the electrode layer 231*a* or 232*a* and the conductive resin layer 231*c* or 232*c* may be disposed in the band portion B1 or B2, the present disclosure is not limited thereto, and may be disposed in the connection portion A1 or A2. In this case, the resin layer 231*b* or 232*b* may fill pores formed in the electrode layer 231*a* or 232*a* in the connection portion A1 or A2, thereby improving moisture resistance reliability of the multilayer electronic component.

Figure 6:
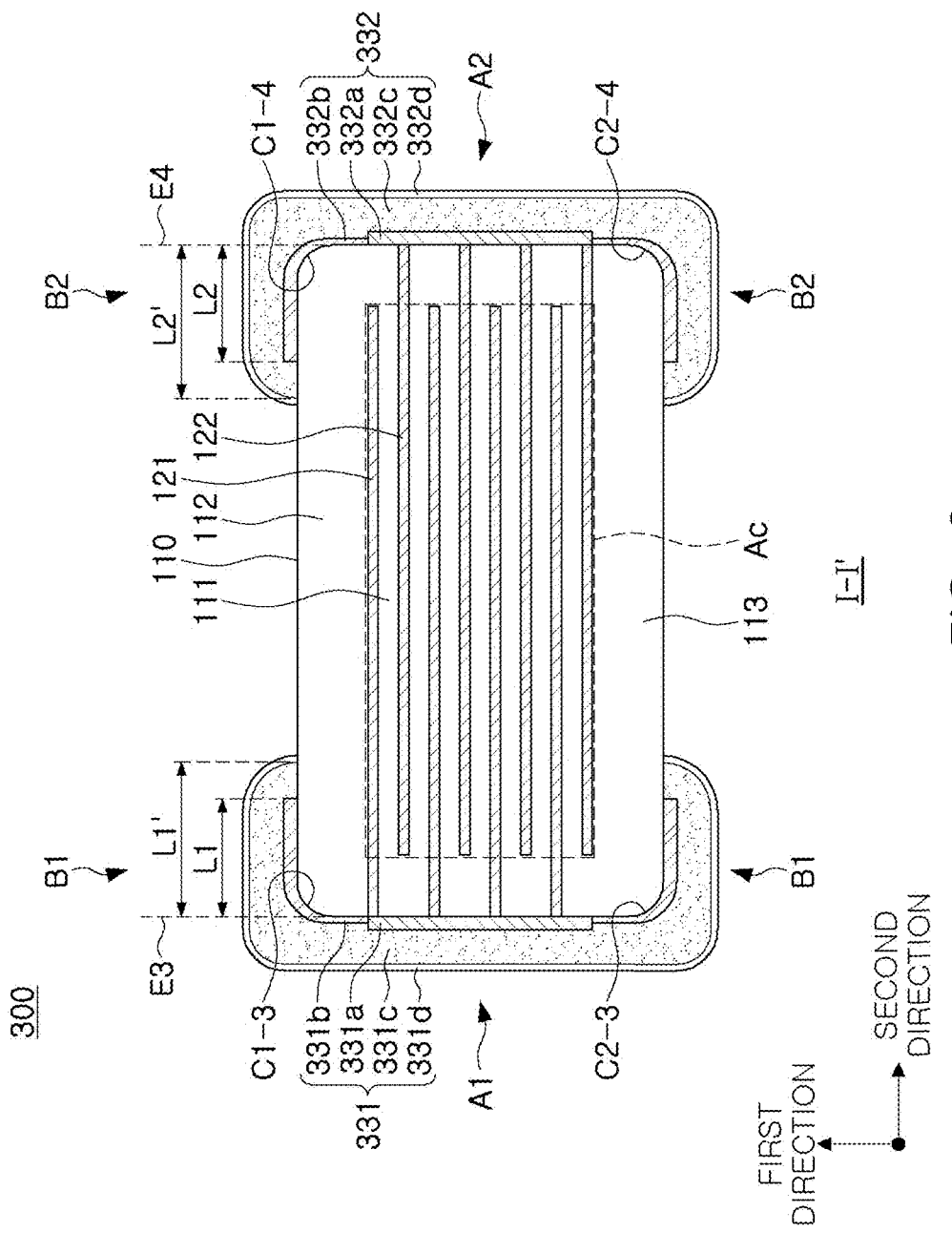
FIG. 6 shows another modified example of FIG. 2.

FIG. 6 shows another modified example of FIG. 2.

A multilayer electronic component 300 according to an exemplary embodiment of the present disclosure may include a first external electrode 331 including a first electrode layer 331*a*, a first resin layer 331*b*, a first conductive resin layer 331*c*, and a first plating layer 331*d*; and a second external electrode 332 including a second electrode layer 332*a*, a second resin layer 332*b*, a second conductive resin layer 332*c*, and a second plating layer 332*d*.

Here, an end of the first electrode layer 331*a* may be disposed on the third surface. In addition, an end of the second electrode layer 332*a* may be disposed on the fourth surface. For example, the electrode layer 331*a* or 332*a* may cover at least a portion of each of two surfaces of the capacitance formation portion Ac in the second direction, and the end of the electrode layer 331*a* or 332*a* may be disposed on the capacitance formation portion Ac, the present disclosure is not limited thereto, and the end of the electrode layer 331*a* or 332*a* may be disposed on the cover portion 112 or 113 and/or the margin portion 114 or 115.

In order to improve adhesive strength between the external electrode 331 or 332 and the body 110, the first resin layer 331*b* may extend from the first or second surface to a portion of the third surface, and the second resin layer 332*b* may extend from the first or second surface to a portion of the fourth surface, but the present disclosure is not limited thereto. In one embodiment, the end of the first electrode layer 331*a* may be in contact with an end of the first resin layer 331*b* on the third surface, without overlapping each other.

In another embodiment, an average thickness of the first electrode layer 331*a* may be larger than an average thickness of the first resin layer 331*b* in the first connection portion A1.

Meanwhile, in order to improve reliability of the multilayer electronic component 300 by blocking a moisture penetration path caused by glass erosion, the first and second electrode layers 331*a* and 332*a* may include no glass, the first and second electrode layers 331*a* and 332*a* may be formed using, for example, an electrolytic plating method and/or an electroless plating method, and the present disclosure is not limited thereto.

Figure 7:
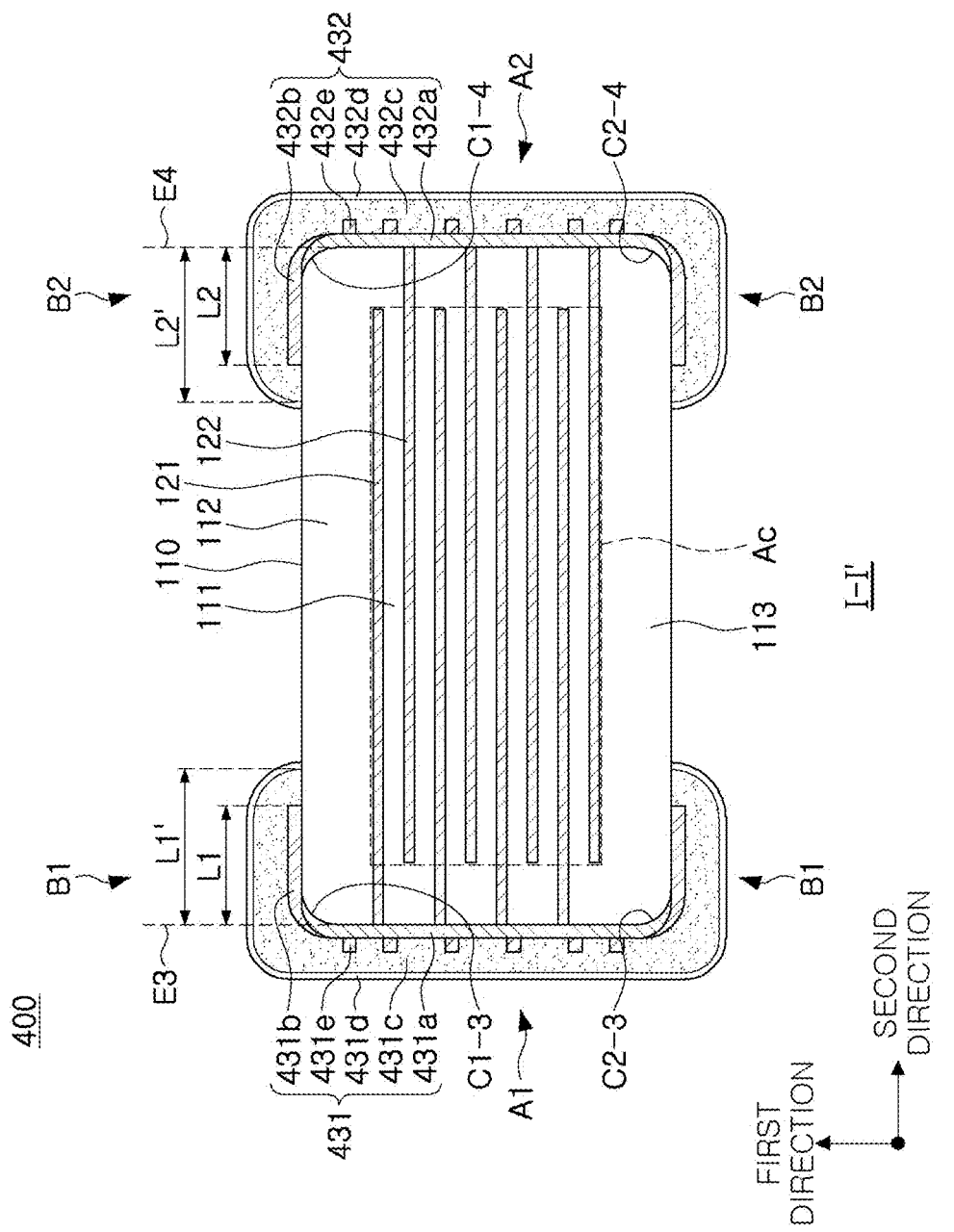
FIG. 7 shows still another modified example of FIG. 2.

FIG. 7 shows still another modified example of FIG. 2.

A multilayer electronic component 400 according to an exemplary embodiment of the present disclosure may include a first external electrode 431 including a first electrode layer 431*a*, a first resin layer 431*b*, a first conductive resin layer 431*c*, and a first plating layer 431*d*; and a second external electrode 432 including a second electrode layer 432*a*, a second resin layer 432*b*, a second conductive resin layer 432*c*, and a second plating layer 432*d*.

Here, the first external electrode 431 may further include a plurality of island-shaped first interface resin portions 431*e* arranged between the first electrode layer 431*a* and the first conductive resin layer 431*c* in the first connection portion A1, and the second external electrode 432 may further include a plurality of island-shaped second interface resin portions 432e arranged between the second electrode layer 432a and the second conductive resin layer 432c in the second connection portion A2.

In this case, the interface resin portion 431e or 432e may fill pores formed in the electrode layer 431a or 432a in the connection portion A1 or A2, thereby improving moisture resistance reliability of the multilayer electronic component.

The first or second interface resin portions 431e or 432e may be formed by dipping the body portion on which the first or second electrode layer 431a or 432a is formed into a resin composition forming the resin layer 431b or 432b, then removing only a portion of the resin composition coated on the connection portion A1 or A2, and curing the same through the heat treatment.

Hereinafter, the description describes a multilayer electronic component according to another exemplary embodiment of the present disclosure. However, the multilayer electronic component according to another exemplary embodiment of the present disclosure may have the same configuration as the multilayer electronic component according to an exemplary embodiment of the present disclosure described above. Therefore, the description omits a description overlapping the above-described description of an exemplary embodiment of the present disclosure.

A multilayer electronic component 100 according to another exemplary embodiment of the present disclosure may include: a body 110 including a dielectric layer 111 and first and second internal electrodes 121 and 122 alternately disposed with each other while having the dielectric layer interposed therebetween, and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; a first external electrode 131 including a first electrode layer 131a disposed on the third surface, a first resin layer 131b in contact with the first and second surfaces, and a first conductive resin layer 131c disposed on the first electrode layer and extending to the first resin layer; and a second external electrode 132 including a second electrode layer 132a disposed on the fourth surface, a second resin layer 132b in contact with the first and second surfaces, and a second conductive resin layer 132c disposed on the second electrode layer and extending to the second resin layer, wherein the first and second resin layers 131b and 132b include no metal, the first and second conductive resin layers 131c and 132c include metal and resin, the first conductive resin layer 131c covers the first resin layer 131b, and the second conductive resin layer 132c covers the second resin layer 132b.

As described above, the resin layer 131b or 132b may serve to secure adhesive strength between the external electrode 131 or 132 and the body portion 110. It is thus possible to prevent a peeling-off phenomenon in which an end of a band portion B1 or B2 is separated, thereby resultantly improving a bending strength of the multilayer electronic component 100.

Here, the resin layers 131b and 132b including no metal may more effectively prevent the adhesive strength between the external electrode 131 or 132 and the body 110 from being lower due to the metal included in the resin layer 131b or 132b and an outer surface of the body 110 in contact with each other.

In addition, the resin layers 131b and 132b may include no metal to thus have ductility and elastic modulus superior to the electrode layer 131a or 132a or the conductive resin layer 131c or 132c, thereby more effectively reducing bending stress applied to the multilayer electronic component.

In addition, the first conductive resin layer 131c may cover the first resin layer 131b, and the second conductive resin layer 132c may cover the second resin layer 132b, thereby preventing an end of the resin layer 131b or 132b from being externally exposed. It is thus possible to prevent the peeling-off phenomenon from occurring in the end of the exposed resin layer 131b or 132b.

It is also possible to prevent the first resin layer 131b from having the lower heat resistance and/or adhesive strength due to the end of the resin layer 131b or 132b that is exposed to a high-temperature environment. It is thus possible to improve the bending strength of the multilayer electronic component 100, and effectively disperse the bending stress applied to the multilayer electronic component to improve reliability of the multilayer electronic component.

(Inventive Example)

First, a body including a dielectric layer and internal electrodes is prepared, and a sheet including conductive metal and glass is then transferred to the third or fourth surface of the body, and then fired to prepare an electrode layer. The body on which the electrode layer is formed is then dipped in a resin composition that includes no metal for the resin composition to be in contact with the first or second surface of the body, and the resin composition coated on the electrode layer of a connection portion is removed. The resin composition is then cured and heat treated to form a resin layer.

In addition, a conductive resin composition including the metal is coated on the body on which the electrode layer and the resin layer are formed, and then cured through heat treatment, a conductive resin layer whose second-directional size is greater than that of the resin layer is formed in a band portion, and a Ni plating layer and a Sn plating layer are sequentially formed on the conductive resin layer, thereby preparing an example. Meanwhile, a comparative example is prepared in the same way as the example except that the comparative example includes no resin layer, and 60 sample chips are prepared for each of the example and comparative example.

Figure 8:
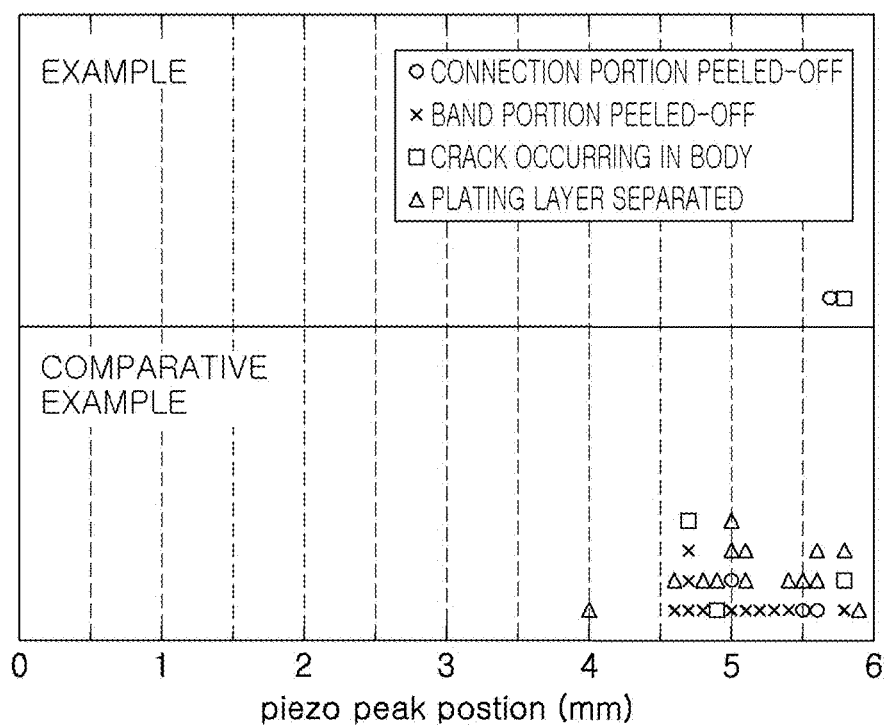
FIG. 8 is a graph evaluating bending strengths of multilayer electronic components in inventive and comparative examples.

FIG. 8 is a graph evaluating the bending strengths of the multilayer electronic components in the example and comparative example. Each sample chip (or multilayer ceramic capacitor (MLCC)) of the example and comparative example is mounted on a board (or a printed circuit board (PCB)), and a surface of the board opposing its surface on which the sample chip (MLCC) is mounted is pressed up to 6 mm to perform a bending strength test. Piezo peak position at a point where a failure occurs under the following conditions is then measured using KEITHLEY instrument and shown in FIG. 8: a range of 2 μA, charge volt of 50V, charge time of 10 seconds, and measure time of 8 seconds.

In addition, in order to observe a failure mode, each sample chip of the example and comparative example is removed from the board, and an image obtained by scanning a cross-section of the MLCC that is cut in the first-second direction from a center of the sample chip in the third direction by using a scanning electron microscope (SEM) is then observed. The following cases are then shown in FIG. 8 by matching each case with the measured piezo peak position: a case (○) where a peeling-off phenomenon starts from the connection portion and a strong peeling-off phenomenon occurs, a case (X) where the peeling-off phenomenon starts from the band portion and a weak peeling-off phenomenon occurs, a case (□) where a crack occurs in the body of the sample chip, and a case (Δ) where the plating layer is separated from the external electrode.

Referring to FIG. 8, the comparative example shows 3 sample chips with the strong peeling-off phenomenon starting from the connection portion, 11 sample chips with the weak peeling-off phenomenon starting from the band portion, 3 sample chips with the cracks in the body, and 14 sample chips with the plating layer separated from the external electrode.

On the other hand, the example only shows one sample chip with the strong peeling-off phenomenon starting from the connection portion, and one sample chip with the cracks in the body, when the piezo peak position is 5 mm or more. As a result, it may be confirmed that the MLCC has reliable bending strength from a bending strength test of 6 mm when the external electrode includes the resin layer and the second-directional size L1' of the conductive resin layer in the band portion is greater than the second-directional size L1 of the resin layer in the band portion.

As set forth above, the present disclosure may provide the multilayer electronic component with the improved bending strength by improving the adhesive strength between the external electrode and body portion thereof.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a dielectric layer and first and second internal electrodes alternately disposed with each other while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
   a first external electrode including a first connection portion disposed on the third surface and a first band portion extending from the first connection portion onto the first and second surfaces; and
   a second external electrode including a second connection portion disposed on the fourth surface and a second band portion extending from the second connection portion onto the first and second surfaces,
   wherein the first external electrode includes a first electrode layer connected to the first internal electrode, a first resin layer including separated, in a cross-section of the body taken along the first and second directions, first and second portions respectively in contact with the first and second surfaces, and a first conductive resin layer disposed on the first electrode layer and extending to the first resin layer,
   the second external electrode includes a second electrode layer connected to the second internal electrode, a second resin layer including separated, in the cross-section of the body taken along the first and second directions, first and second portions respectively in contact with the first and second surfaces, and a second conductive resin layer disposed on the second electrode layer and extending to the second resin layer, and
   L1'≥L1 when L1 indicates a second-directional size of the first resin layer in the first band portion, and L1' indicates a second-directional size of the first conductive resin layer in the first band portion.

2. The multilayer electronic component of claim 1, wherein L1 and L1' are measured from the third surface of the body to respective ends of the first resin layer and the first conductive resin layer in the second direction.

3. The multilayer electronic component of claim 1, wherein L2'≥L2 when L2 indicates a second-directional size of the second resin layer in the second band portion, and L2' indicates a second-directional size of the second conductive resin layer in the second band portion, wherein L2 and L2' are measured from the fourth surface of the body to respective ends of the second resin layer and the second conductive resin layer in the second direction.

4. The multilayer electronic component of claim 1, wherein the first and second resin layers include no metal.

5. The multilayer electronic component of claim 1, wherein the first and second resin layers further include one or more of silica, alumina, glass, or zirconium dioxide ($ZrO_2$).

6. The multilayer electronic component of claim 1, wherein the first and second conductive resin layers include metal and resin.

7. The multilayer electronic component of claim 1, wherein T1'≥T1 when T1 indicates an average thickness of the first resin layer in the first band portion, and T1' indicates an average thickness of the first conductive resin layer in the first band portion, wherein T1 and T1' are measured from the first surface to respective upper surfaces, or from the second surface to respective lower surfaces, of the first resin layer and the first conductive resin layer in the first direction.

8. The multilayer electronic component of claim 7, wherein T1 is 9 μm or less.

9. The multilayer electronic component of claim 1, wherein the body includes a 1-3-th corner connecting the first surface and the third surface to each other, a 2-3-th corner connecting the second surface and the third surface to each other, and
   ends of the first electrode layer are disposed on the 1-3-th corner and the 2-3-th corner.

10. The multilayer electronic component of claim 9, wherein the first electrode layer and the first resin layer overlap each other on the 1-3-th corner and the 2-3-th corner.

11. The multilayer electronic component of claim 10, wherein at least one of the 1-3-th or 2-3-th corner is rounded.

12. The multilayer electronic component of claim 1, wherein ends of the first electrode layer are disposed on the first and second surfaces, and
   the first resin layer in the first band portion extends between the first electrode layer and the first conductive resin layer.

13. The multilayer electronic component of claim 12, wherein L1 is larger than or equal to a second-directional size of the first electrode layer in the first band portion, which is measured from the third surface to one end of the first electrode in the second direction.

14. The multilayer electronic component of claim 1, wherein an end of the first electrode layer is disposed on the third surface.

15. The multilayer electronic component of claim 14, wherein the end of the first electrode layer is in contact with an end of the first resin layer on the third surface, without overlapping each other.

16. The multilayer electronic component of claim 15, wherein an average thickness of the first electrode layer is larger than an average thickness of the first resin layer in the first connection portion.

17. The multilayer electronic component of claim 14, wherein the first electrode layer includes no glass.

18. The multilayer electronic component of claim 1, wherein the first external electrode further includes a plurality of island-shaped first interface resin portions arranged between the first electrode layer and the first conductive resin layer in the first connection portion, and the second external electrode further includes a plurality of island-shaped second interface resin portions arranged between the second electrode layer and the second conductive resin layer in the second connection portion.

19. A multilayer electronic component comprising:

a body including a dielectric layer and first and second internal electrodes alternately disposed with each other while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction;

a first external electrode including a first electrode layer disposed on the third surface, a first resin layer in contact with the first and second surfaces, and a first conductive resin layer disposed on the first electrode layer and extending to the first resin layer; and a second external electrode including a second electrode layer disposed on the fourth surface, a second resin layer in contact with the first and second surfaces, and a second conductive resin layer disposed on the second electrode layer and extending to the second resin layer, wherein the first and second resin layers include no metal, the first and second conductive resin layers include metal and resin, the first conductive resin layer covers an end portion of the first resin layer in contact with the first or second surface, and the second conductive resin layer covers an end portion of the second resin layer in contact with the first or second surface.

20. The multilayer electronic component of claim 19, wherein the first and second resin layers further include one or more of silica, alumina, glass, or zirconium dioxide ($ZrO_2$).

* * * * *